United States Patent
Jung et al.

(10) Patent No.: US 8,145,227 B2
(45) Date of Patent: *Mar. 27, 2012

(54) METHOD OF DETERMINING AN ACCESS MODE OF CELL IN A WIRELESS COMMUNICATION SYSTEM

(75) Inventors: Sung-Hoon Jung, Gyeonggi-Do (KR); Sung-Duck Chun, Gyeonggi-Do (KR); Seung-June Yi, Gyeonggi-Do (KR); Young-Dae Lee, Gyeonggi-Do (KR); Sung-Jun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/210,256

(22) Filed: Aug. 15, 2011

(65) Prior Publication Data

US 2011/0306336 A1 Dec. 15, 2011

Related U.S. Application Data

(63) Continuation of application No. 12/591,658, filed on Nov. 25, 2009, now Pat. No. 8,027,687.

(60) Provisional application No. 61/118,469, filed on Nov. 27, 2008.

(30) Foreign Application Priority Data

Oct. 30, 2009 (KR) ........................ 10-2009-0104513
Nov. 19, 2009 (GB) .................................. 0920309.2
Nov. 23, 2009 (EP) .................................... 09176710

(51) Int. Cl.
*H04W 72/00* (2009.01)

(52) U.S. Cl. ..................... 455/450; 455/435.1; 455/436; 455/422.1; 370/312; 370/328; 370/331

(58) Field of Classification Search ........ 455/450–452.2, 455/436; 370/312, 328, 338
See application file for complete search history.

(56) References Cited

U.S. PATENT DOCUMENTS 6,640,105 B1 * 10/2003 Shin .............................. 455/453
6,934,550 B2 * 8/2005 Kearney et al. ............... 455/458

(Continued)

FOREIGN PATENT DOCUMENTS

EP 2201797 3/2009

(Continued)

OTHER PUBLICATIONS

Vodafone Group: "Signalling on a CSG Cell", 3GPP DRAFT; R2-072831, $3^{rd}$ Generation Partnership Project (3GPP), Mobile Competence Centre; 650, Route Des Lucioles; F-06921 Sophia-Antipolis Cedex; France, vol. RAN WG2, No. Orlando, USA; 20070702, Jul. 2, 2007, XP050135608.

*Primary Examiner* — Sharad Rampuria
(74) *Attorney, Agent, or Firm* — McKenna Long & Aldridge LLP

(57) ABSTRACT

The present invention relates to a wireless communication system and UE providing wireless communication services, and a method of determining the operation mode of a base station, that is, the connection mode (access mode) of a cell, based on which UE's connection is allowed by a base station in an evolved Universal Mobile Telecommunications System (UMTS) that has evolved from a Universal Mobile Telecommunications System (UMTS) or a Long Term Evolution (LTE) system, and it may be an object of the present invention to provide a process of determining the connection mode of a cell by checking the existence of a subscriber group identity if it is determined that the connection mode of a cell is not allowed for one or more UEs belonging to a particular subscriber group.

15 Claims, 13 Drawing Sheets

U.S. PATENT DOCUMENTS

| | | | |
|---|---|---|---|
| 6,952,583 B1 * | 10/2005 | Park et al. | 455/434 |
| 6,961,570 B2 * | 11/2005 | Kuo et al. | 455/436 |
| 6,963,745 B2 * | 11/2005 | Singh et al. | 455/437 |
| 7,068,636 B2 * | 6/2006 | Kuo | 370/338 |
| 7,558,228 B2 * | 7/2009 | Lee et al. | 370/312 |
| 7,636,330 B2 * | 12/2009 | Lee et al. | 370/312 |
| 2008/0267153 A1 | 10/2008 | Mukherjee et al. | |
| 2009/0070694 A1 | 3/2009 | Ore et al. | |
| 2009/0156208 A1 | 6/2009 | Vesterinen et al. | |
| 2009/0262683 A1 | 10/2009 | Khetawat et al. | |
| 2010/0110987 A1 | 5/2010 | Subramanian et al. | |
| 2010/0240366 A1 | 5/2010 | Bi et al. | |

FOREIGN PATENT DOCUMENTS

| | | |
|---|---|---|
| EP | 2191806 A2 | 11/2009 |
| KR | 1020050014315 A | 2/2005 |
| WO | WO 2005006829 A2 | 1/2005 |
| WO | WO 2008112161 A2 | 9/2008 |
| WO | WO 2008/134281 | 11/2008 |
| WO | WO 2009/022980 | 2/2009 |
| WO | WO 2009/044317 | 4/2009 |
| WO | WO 2009068561 A2 | 6/2009 |
| WO | WO 2009/149431 | 12/2009 |
| WO | WO 2010058972 A2 | 5/2010 |

* cited by examiner

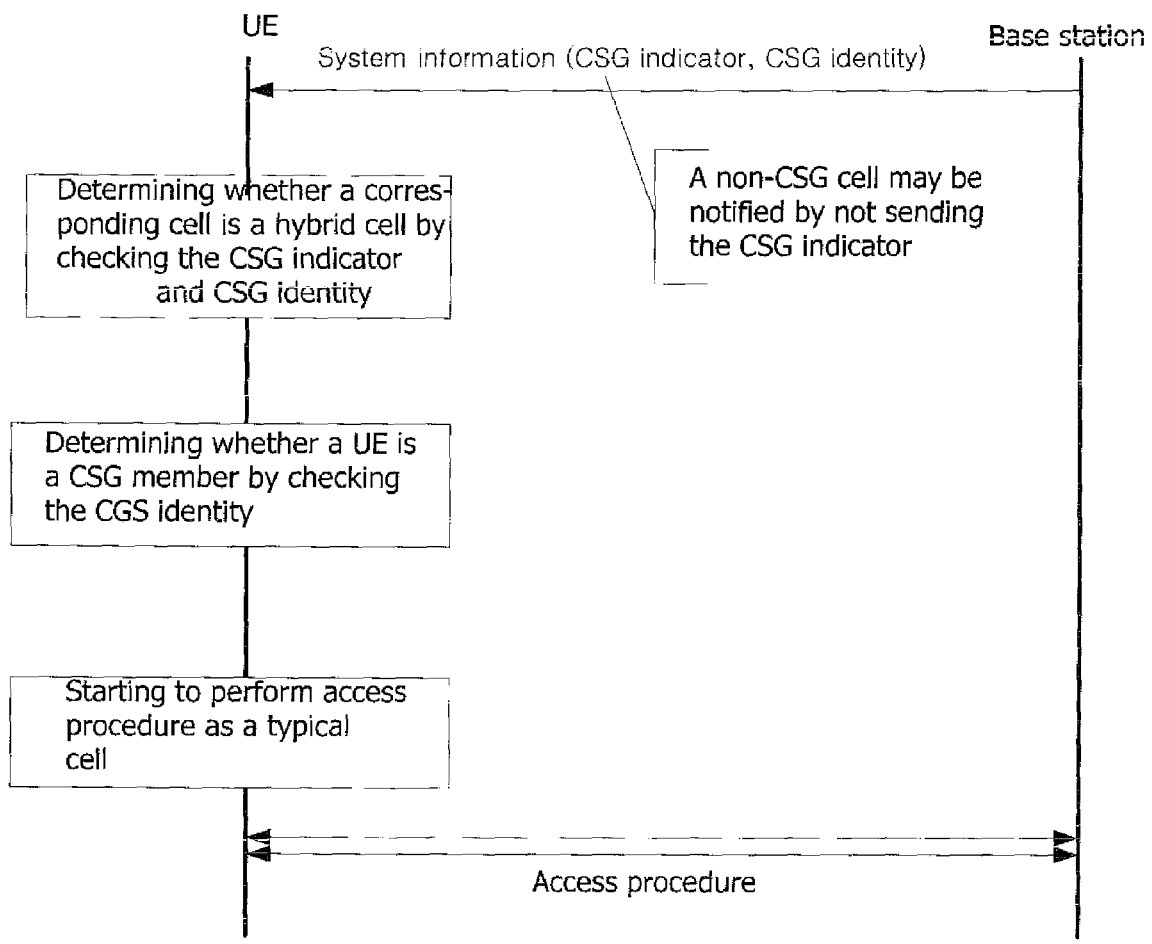

METHOD OF DETERMINING AN ACCESS MODE OF CELL IN A WIRELESS COMMUNICATION SYSTEM

CROSS-REFERENCE

This application is a continuation of and claims the benefit of U.S. application Ser. No. 12/591,658, filed Nov. 25, 2009 now U.S. Pat. No. 8,027,687, and claims priority benefit to the following applications: U.S. Provisional Application No. 61/118,469 (filed Nov. 27, 2008), Korean Patent Application No. 10-2009-01 0451 3 (filed Oct. 30, 2009), United Kingdom Patent Application No. 0920309.2 (filed Nov. 19, 2009), and European Patent Application No. 09176710.3 (filed Nov. 23, 2009), the contents of each of the above-recited application are incorporated by reference herein.

BACKGROUND OF THE INVENTION

1. Field of the Invention

The present invention relates to a wireless communication system and user equipment providing wireless communication services, and a method of determining the operation mode of a base station, that is, the connection mode (access mode) of a cell, based on which user equipment's connection is allowed by a base station in an evolved Universal Mobile Telecommunications System (UMTS) that has evolved from a Universal Mobile Telecommunications System (UMTS) or a Long Term Evolution (LTE) system, and more particularly, to a method of determining the connection mode of a cell by checking the existence of a subscriber group identity if it is determined that the connection mode of a cell is not allowed for one or more user equipment belonging to a particular subscriber group.

2. Description of the Related Art

FIG. 1 is a view illustrating a network architecture of an Evolved Universal Terrestrial Radio Access Network (E-UTRAN), which is a mobile communication system to which the related art and the present invention are applied. The E-UTRAN system has evolved from the existing UTRAN system, and a basic standardization work thereof is currently going on in 3GPP. The E-UMTS system may be also referred to as a Long Term Evolution (LTE) system.

The E-UTRAN includes a plurality of e-NBs (e-NodeB; hereinafter, referred to as "base station"), and the plurality of eNBs are connected to one another through an X2 interface. The eNB is connected to user equipment (hereinafter, referred to as "UE") via a wireless interface, and connected to an Evolved Packet Core (EPC) through an S1 interface.

The EPC may include a Mobility Management Entity (MME), a Serving-Gateway (S-GW), and a Packet Data Network-Gateway (PDN-GW). The MME has information on the connection of UE or the capability of UE, and such information is primarily used for the mobility management of the UE. The S-GW is a gateway having E-UTRAN as an end point, and the PDN-GW is a gateway having PDN as an end point.

The radio interface protocol layers between UE and a network can be divided into a first layer (L1), a second layer (L2) and a third layer (L3) based on three lower layers of an Open System Interconnection (OSI) reference model widely known in communications systems. A physical layer belonging to the first layer provides information transfer services using a physical channel, and a radio resource control (hereinafter, referred to as "RRC") layer located at the third layer plays a role of controlling radio resources between UE and a network. For the purpose of this, the RRC layer exchanges RRC messages between UE and a network.

FIGS. 2 and 3 are views illustrating an architecture of a radio interface protocol between UE and a base station based on the 3GPP radio access network standard. The radio interface protocol horizontally includes a physical layer, a data link layer, and a network layer, and vertically divided into a user plane (U-plane) for transmitting data information and a control plane (C-plane) for transferring a control signaling. The protocol layers of FIGS. 2 and 3 can be divided into a first layer (L1), a second layer (L2) and a third layer (L3) based on three lower layers of an Open System Interconnection (OSI) reference model widely known in communications systems. Those radio protocol layers exist as a pair in the UE and the E-UTRAN to perform a data transmission for the radio section.

Hereinafter, each layer in a radio protocol control plane of FIG. 2 and a radio protocol user plane of FIG. 3 will be described.

The first layer as a physical layer provides an information transfer service to an upper layer using a physical channel. The physical layer is connected to its upper layer, called a Medium Access Control (MAC) layer, via a transport channel, and data is transferred between the MAC layer and the physical layer via the transport channel. Furthermore, data is transferred via a physical channel between different physical layers, in other words, between the physical layer of a transmitting side and the physical layer of a receiving side. The physical channel is modulated by an Orthogonal Frequency Division Multiplexing (OFDM) scheme and time and frequency are used as radio resources for the channel.

The Medium Access Control (hereinafter, referred to as "MAC") layer located at the second layer provides a service to its upper layer, called a Radio Link Control (hereinafter, referred to as "RLC") layer, via a logical channel. The RLC layer of the second layer supports reliable data transmissions. The function of the RLC layer may be implemented as a functional block in the MAC layer. In this case, the RLC layer may not exist. A Packet Data Convergence Protocol (PDCP) layer of the second layer is used to efficiently transmit IP packets, such as IPv4 or IPv6, in the radio section having a relatively small bandwidth. For this purpose, the PDCP layer performs a header compression function for reducing the size of an IP packet header, which is relatively large in size and includes unnecessary control information.

A Radio Resource Control (hereinafter, referred to as "RRC") layer located at the uppermost portion of the third layer is only defined in the control plane. The RRC layer takes charge of controlling logical channels, transport channels and physical channels in relation to the configuration, re-configuration and release of Radio Bearers (RBs). Here, the RB denotes a service provided by the second layer to perform a data transmission between the UE and the UTRAN. If an RRC connection is established between a RRC layer of the UE and a RRC layer of the UTRAN, then the UE is in an RRC_CONNECTED state. Otherwise, the UE is in an RRC_IDLE state.

Downlink transport channels for transmitting data from a network to UE may include a Broadcast Channel (BCH) for transmitting system information, and a downlink Shared Channel (SCH) for transmitting other user traffic or control messages. In case of traffic or control messages of a downlink multicast or broadcast service, they may be transmitted either via a downlink SCH, or via a separate downlink Multicast Channel (MCH). On the other hand, uplink transport channels for transmitting data from UE to a network may include a Random Access Channel (RACH) for transmitting an initial control message and an uplink Shared Channel (SCH) for transmitting user traffic or control messages.

Logical channels which are located at an upper level of transport channels and mapped to the transport channels may include a Broadcast Control Channel (BCCH), a Paging Control Channel (PCCH), a Common Control Channel (CCCH), a Multicast Control Channel (MCCH), a Multicast Traffic Channel (MTCH), and the like.

A physical channel includes multiple sub-frames arranged on a time axis and multiple sub-carriers arranged on a frequency axis. Here, a sub-frame includes a plurality of symbols on the time axis. A sub-frame includes a plurality of resource blocks each including a plurality of symbols and a plurality of sub-carriers. Also, each sub-frame can use particular sub-carriers of particular symbols (e.g., a first symbol) in the relevant sub-frame for a Physical Downlink Control Channel (PDCCH), that is, a L1/L2 control channel. A sub-frame has a time duration of 0.5 ms. A Transmission Time Interval (TTI) as a unit time for transmitting data is 1 ms, corresponding to two sub-frames.

Hereinafter, an RRC state and an RRC connection method of UE will be described in detail. The RRC state refers to whether or not the RRC of the UE is logically connected to the RRC of an E-UTRAN. If connected, then it is called an RRC_CONNECTED state, and otherwise it is called an TTC_IDLE state. For the UE in an RRC_CONNECTED state, the E-UTRAN can recognize the existence of the relevant UE in a cell unit because there exist an RRC connection thereof, and thus the E-UTRAN can effectively control the UE. On the contrary, for the UE in RRC_IDLE state, the E-UTRAN cannot recognize the relevant UE, and therefore, it is managed by a core network in a tracking area unit, which is a unit larger than a cell. In other words, the existence of the UE in an RRC_IDLE state is only recognized in a large area unit, and therefore, it should be changed to an RRC_CONNECTED state in order to receive typical mobile communication services such as voice or data.

When the UE is initially turned on by a user, the UE first searches for a suitable cell and then is camped in an RRC_IDLE state in the corresponding cell. The UE camped in an RRC_IDLE state makes an RRC connection with the RRC of the E-UTRAN through an RRC connection procedure when it is required to make an RRC connection, thereby changing the state to an RRC_CONNECTED state. There are several cases when the UE in an idle state is required to make an RRC connection. For example, an uplink data transmission may be required due to a phone call attempt by the user, or the like, or the transmission of a response message may be required in response to a paging message received from the E-UTRAN.

The Non-Access Stratum (NAS) layer located at an upper level of the RRC performs a function such as session management, mobility management, and the like.

In order to manage the mobility of the UE at the NAS layer, both an EPS Mobility Management-REGISTERED (EMM-REGISTERED) state and an EMM-DEREGISTERED state are defined, and both states will be applied to the UE and a Mobility Management Entity (MME). The UE is initially in an EMM-DEREGISTERED state, and carries out a process of registering it into the corresponding network through an 'Initial Attach' procedure in order to access a network. If this 'Attach' procedure has been successfully carried out, then the UE and the MME will be in an EMM-REGISTERED state.

In order to manage a signaling connection between the UE and the EPC, both an EPS Connection Management (ECM)-IDLE state and an ECM-CONNECTED state are defined, and the both states will be applied to the UE and the MME. If the UE in an ECM-IDLE state makes an RRC connection with E-UTRAN, then it will be in an ECM-CONNECTED state. If the MME in an ECM-IDLE state makes an S1 connection with E-UTRAN, then it will be in an ECM-CONNECTED state. When the UE is in an ECM-IDLE state, the E-UTRAN has no context information of the UE. Therefore, the UE in an ECM-IDLE state carries out a UE-based mobility procedure such as a cell selection or reselection without receiving a command from the network. On the contrary, when the UE is in an ECM-CONNECTED state, the mobility of the UE is managed by a command of the network. If the location of the UE in an ECM-IDLE state is changed from the location that has been recognized by the network, the UE performs a Tracking Area Update procedure to notify the network of the corresponding location of the UE.

Next, system information will be described. The system information includes essential information for the UE to know in order to access a base station. Therefore, the UE should have received all of the system information prior to accessing the base station, and also should have the latest system information all the time. Furthermore, the base station periodically transmits the system information because the system information should be notified to every UE in a cell.

The system information can be divided into MIB, SB, SIB, and the like. The Master Information Block (MIB) allows the UE to be notified of a physical architecture of the corresponding cell, for example, a bandwidth, and the like. The Scheduling Block (SB) notifies of the transmission information of SIBs, for example, transmission period, and the like. The System Information Block (SIB) is a set of mutually-related system information. For example, a certain SIB includes only the information of neighboring cells, and another certain SIB includes only the information of uplink radio channels used by the UE.

In the related art, based on which UE's connection is allowed by a base station, the operation modes of the base station can be divided into several access modes. Here, the base station may organize a closed subscriber group in order to provide higher quality services to subscribers in the corresponding group. The base station delivers information, namely, a CSG indicator, for allowing the UE to determine whether it is operating in an access mode (CSG cell) that allows the access only to the UEs belonging to a closed subscriber group, or in an access mode (typical or general cell) that there is no restriction in which the UE should belong to a particular group.

However, in addition to the two types of access mode (CSG cell, typical cell), the base station may use a mixed form of the two types of access mode. When the base station is operating in such a hybrid access mode, those three access modes cannot be appropriately classified by using a method of classifying the access mode only with the CSG indicator. In this case, there is a problem that the UE may not receive CSG services from the base station though it is a member of the CSG.

SUMMARY OF THE INVENTION

Accordingly, an object of the present invention is to provide a method of determining the access mode of a cell in a wireless communication system more effectively than the related art.

In order to solve the foregoing problem, a method of determining an access mode of a cell in a wireless communication system according to the present invention is characterized by including the steps of determining whether the access mode of the cell is a first mode, wherein one or more UEs in a particular subscriber group are only allowed to be accessed in the first mode; checking an existence of a subscriber group identity, if it is determined that the access mode of the cell is not the first mode; and considering the access mode of the cell as a second mode, if the subscriber group identity exists, wherein the one or more UEs in the particular subscriber group or all UEs in the cell are selectively allowed to be accessed in the second mode.

Also, in order to solve the foregoing problem, a method of determining an access mode of a cell in a wireless communication system according to the present invention is characterized by including the steps of determining whether UE supports a particular access mode of the cell, wherein one or more UEs in a particular subscriber group or all UEs in the cell are selectively allowed to be accessed in the particular access mode; checking a subscriber group identity, if it is determined that the UE supports the particular access mode; and checking a subscriber group indicator in order to determine the access mode of the cell, if it is determined that the UE does not support the particular access mode.

Also, in order to solve the foregoing problem, a method of determining an access mode of a cell in a wireless communication system according to the present invention is characterized by including the step of providing information and a subscriber group identity to UE in order to determine the access mode of the cell, wherein the information indicates that the UE is not in a particular access mode, and the particular access mode only allows one or more UEs in a particular subscriber group to be accessed.

According to the present invention, in order to recognize the type of cell the UE checks the existence of a CSG identity in addition to a CSG indicator, thereby allowing the UE to distinguish a hybrid cell from other types of cell. Furthermore, according to the present invention, if it is checked by the UE that the cell is a hybrid cell, then in case of the UE supporting CSG, the CSG may be additionally checked, and the relevant (or corresponding) cell will be recognized as a CSG cell if it is a CSG member. Through this, the present invention allows the UE to be accessed as a CSG member if the UE is a member of the CSG in a hybrid cell.

Through the present invention, if the UE finally recognizes a hybrid cell as a CSG cell to which the UE itself belongs as a member, then the UE may notify the network that the UE itself is a member of the object cell when trying to access the cell or transmitting a handover request to the network. Then, the network including the object cell may regard that the corresponding CSG member has a higher priority during an access or handover based on the management policy. For example, when many UEs try to access or hand over to a hybrid cell and as a result the competition of resources occurs, the network may provide a priority to a CSG member, thereby providing better-quality services for the CSG member.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 13 is an exemplary view illustrating a process for connecting a base station by non-CSG subscription member UE in a hybrid cell.

DETAILED DESCRIPTION OF THE INVENTION

Figure 1:
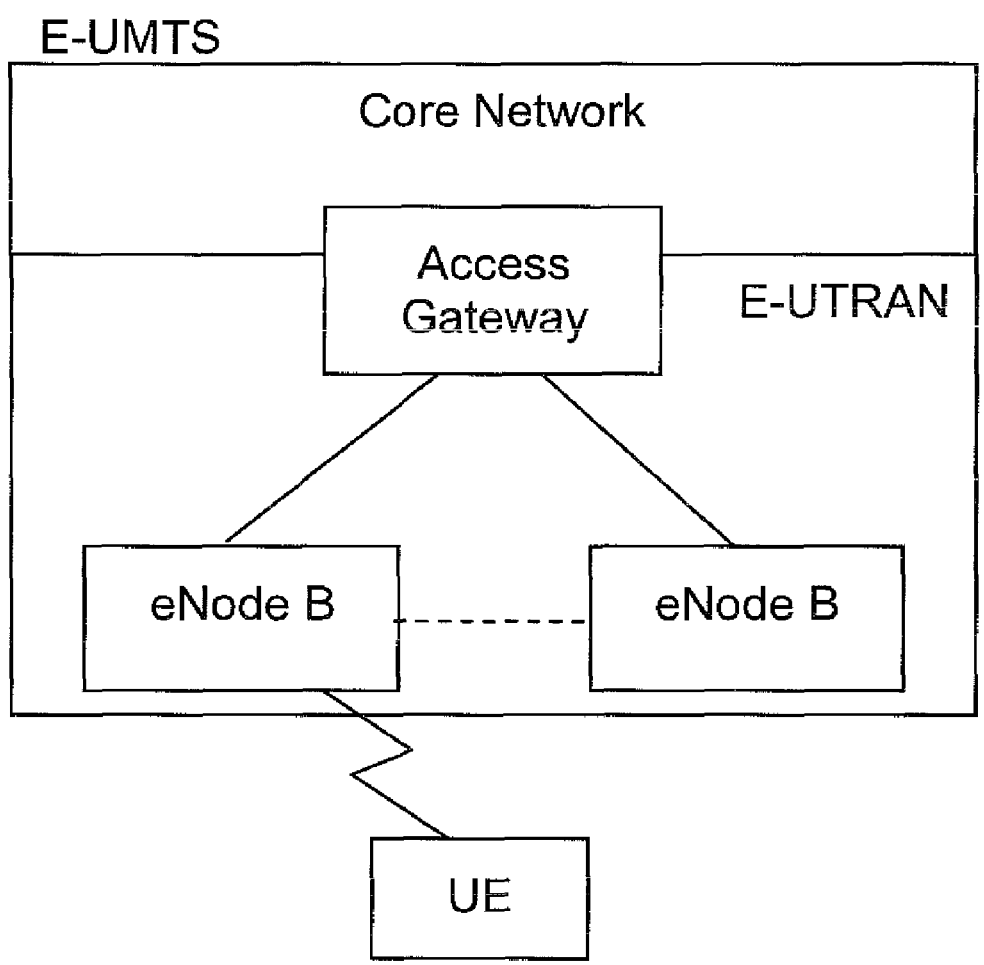
FIG. 1 is a view illustrating a network architecture of E-UTRAN, which is a mobile communication system to which the related art and the present invention are applied.
Figure 2:
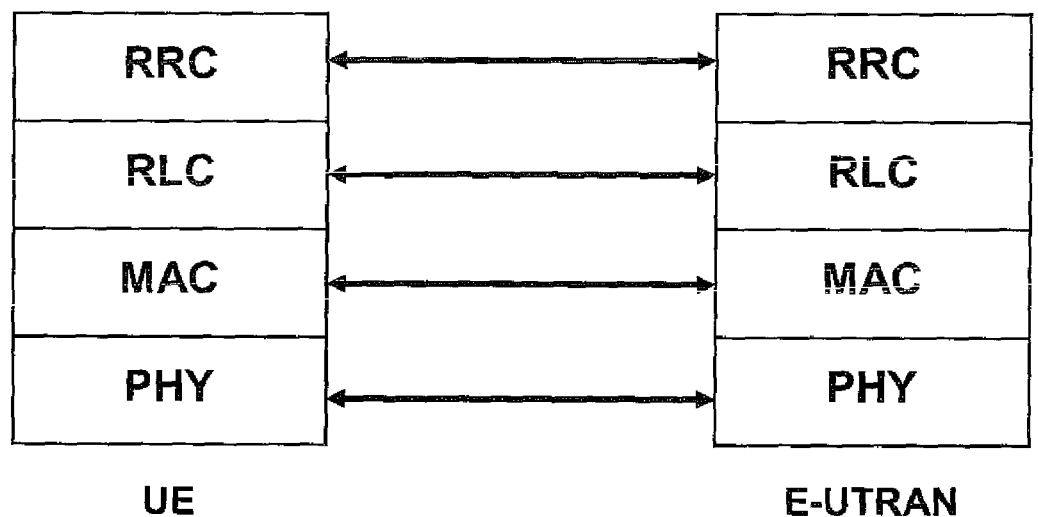
FIG. 2 is an exemplary view illustrating a control plane architecture in a radio interface protocol between UE and E-UTRAN in the related art.
Figure 3:
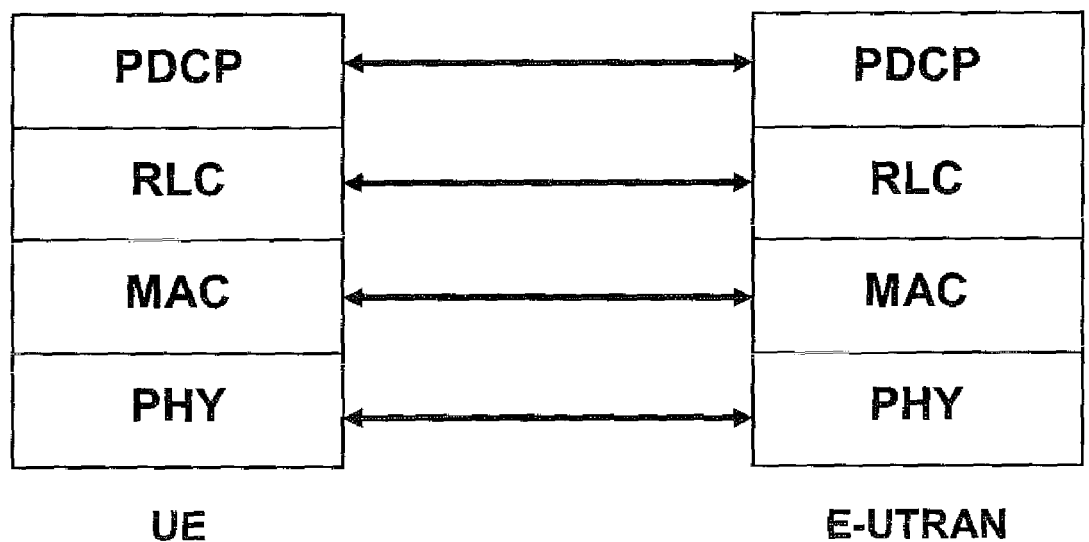
FIG. 3 is an exemplary view illustrating a user plane architecture in a radio interface protocol between UE and E-UTRAN in the related art.

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

The present invention may be applied to a 3GPP communication technology, particularly to a Universal Mobile Telecommunications System (UMTS), system, and a communication device and method thereof. However, the present invention is not limited to this, but may be applied to every wire/wireless communication to which technical spirit of the present invention can be applied.

According to a basic concept of the present invention, there is proposed a method of determining an access mode of a cell in a wireless communication and proposed a wireless mobile communication UE (or terminal) capable of performing such a method, which is characterized by including the steps of determining whether the access mode of the cell is a first mode, wherein one or more UEs in a particular subscriber group are only allowed to be accessed in the first mode; checking an existence of a subscriber group identity, if it is determined that the access mode of the cell is not the first mode; and considering the access mode of the cell as a second mode, if the subscriber group identity exists, wherein the one or more UEs in the particular subscriber group or all UEs in the cell are selectively allowed to be accessed in the second mode.

According to the present invention, furthermore, there is proposed a method of determining an access mode of a cell in a wireless communication and proposed a wireless mobile communication UE capable of performing such a method, which is characterized by including the steps of determining whether UE supports a particular access mode of the cell, wherein one or more UEs in a particular subscriber group or all UEs in the cell are selectively allowed to be accessed in the particular access mode; checking a subscriber group identity, if it is determined that the UE supports the particular access mode; and checking a subscriber group indicator in order to determine the access mode of the cell, if it is determined that the UE does not support the particular access mode.

According to the present invention, furthermore, there is proposed a method of determining an access mode of a cell in a wireless communication and proposed a network capable of performing such a method, which is characterized by including the steps of providing information and a subscriber group identity to the UE in order to determine the access mode of the cell, wherein the information indicates that the UE is not in a particular access mode, and the particular access mode only allows one or more UEs in a particular subscriber group to be accessed.

Hereinafter, the configuration and operation of preferred embodiments according to the present invention will be described with reference to the accompanying drawings.

In general, network services provided to UE can be divided into three types as follows. Furthermore, the UE may recognize the type of a cell differently based on which service can be received. First, the type of services will be described, and then the type of a cell will be described below.

1) Limited service: This service provides an emergency call and an earthquake and tsunami warning system (ETWS), and may be provided in an acceptable cell.

2) Normal service: This service denotes a public use with general purposes, and may be provided in a suitable or normal cell.

3) Operator service: This service denotes a service for communication network service providers, and this cell can be only used by communication network service providers but cannot be used by typical users.

With regard to the service types provided by a cell, the type of a cell can be divided as follows.

1) Acceptable cell: A cell in which the UE can receive a limited service. This cell is not barred and satisfies the cell selection criteria of the UE from a standpoint of the corresponding UE.

2) Suitable cell: A cell in which the UE can receive a normal service. This cell satisfies the condition of an acceptable cell, and at the same time satisfies additional conditions. For additional conditions, the cell should be attached to PLMN to which the corresponding UE can be accessed, and it should be a cell in which the implementation of a tracking area update procedure by the UE is not barred. If the relevant (or corresponding) cell is a CSG cell, then it should be a cell that can be accessed by the UE as a CSG member.

3) Barred cell: A cell broadcasting information that it is a barred cell through the system information.

4) Reserved cell: A cell broadcasting that it is a reserved cell through the system information.

Figure 4:
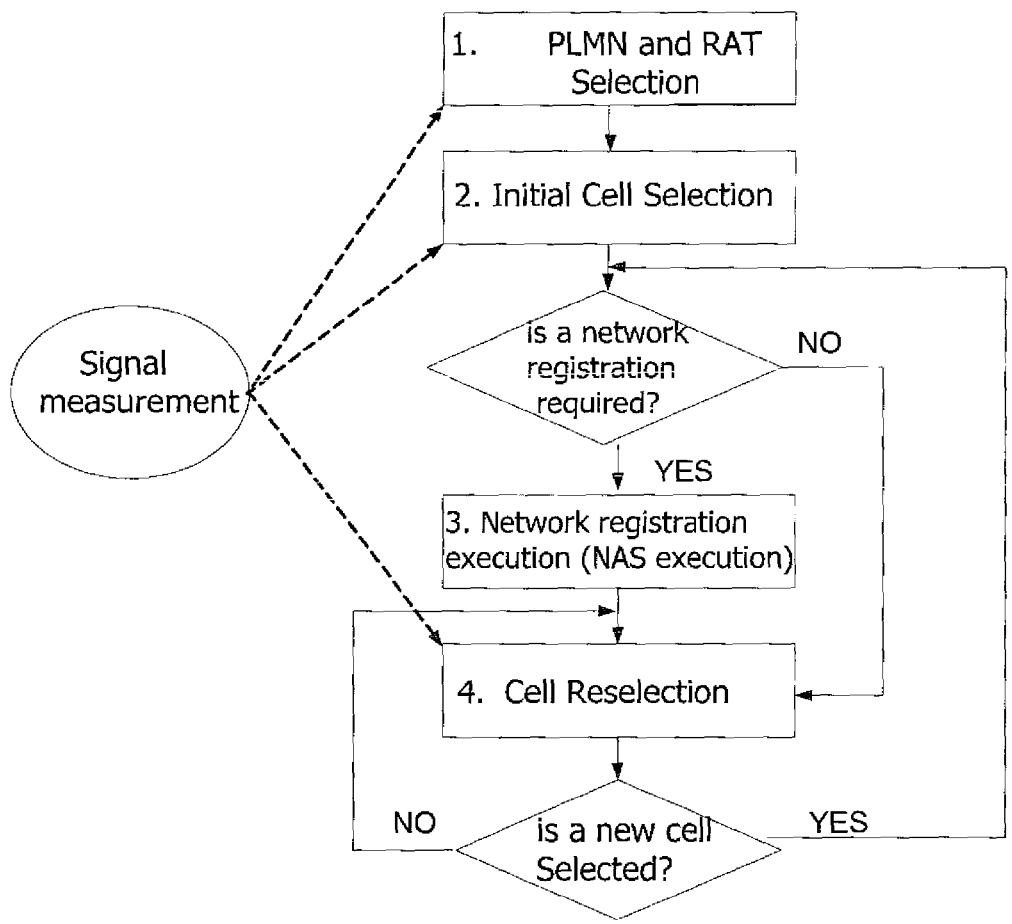
FIG. 4 is an exemplary view illustrating a procedure for the operation of UE selecting a cell in the idle mode.

FIG. 4 is an exemplary view illustrating the operation of UE selecting a cell in the idle mode.

In the first step, the UE selects a Radio Access Technology (hereinafter, referred to as "RAT") for communicating with a Public Land Mobile Network (hereinafter, referred to as "PLMN") from which the UE itself desires to receive a service. The information of PLMN and RAT may be selected by the user of the UE, and what is stored in the USIM may be also used.

In the second step, the UE selects a cell having the largest value among the cells that the measured base station has a value greater than a particular value in the signal intensity and quality (cell selection). Then, it receives SI being sent by the base station. The particular value denotes a value defined by a system to guarantee the quality of physical signals in the data transmission and/or reception. Accordingly, the value may vary based on the RAT to be applied.

In the third step, the UE registers its own information (for example, IMSI) for receiving a service (for example, paging) from a network. Here, the UE is not registered into a network to be accessed whenever selecting a cell but registered into a network in case when network information received from SI (for example, Tracking Area Identity (TAI)) is different from network information that the UE itself knows.

In the fourth step, if a value of the signal intensity and quality measured by the base station from which the UE receives a service is less than a value measured by the base station of the neighboring cell, then the UE selects one of the other cells providing signals having better characteristics than those of the cell of the base station being accessed by the UE. This process is called a cell reselection to distinguish it from an initial cell selection in the second step. At this time, a time restriction condition may be specified in order to prevent a cell from being frequently reselected based on the change of the signal characteristics.

Next, a procedure for selecting a cell by the UE will be described in detail. If the UE is turned on, then the UE should perform preparation procedures for selecting a cell having a suitable quality in order to receive a service.

The UE in a RRC_IDLE state should select a cell having a suitable quality all the time, and thus be prepared to receive a service through the cell. For example, the UE that has been just turned on should select a cell having a suitable quality to be registered into a network. If the UE that has been in a RRC_CONNECTED state enters into an RRC_IDLE state, then the UE should select a cell in which the UE itself is camped on. In this manner, a process of selecting a cell satisfying a predetermined condition by the UE in order to be camped in a service waiting state such as the RRC_IDLE state, is called a cell selection. The cell selection is performed in a state that the UE does not currently determine a cell in which the UE itself is camped in the RRC_IDLE state, and thus it is very important to select the cell as quickly as possible. Therefore, if it is a cell providing a radio signal quality greater than a predetermined level, then it may be selected during a cell selection process by the UE even though the cell is not a cell providing best radio signal quality.

Hereinafter, a method and procedure for selecting a cell by LTE UE will be described in detail. If power is initially turned on, the UE searches for available PLMNs and selects a suitable PLMN to receive a service. Subsequently, the UE selects a cell having a signal quality and characteristic capable of receiving a suitable service among the cells being provided by the selected PLMN. Here, the cell selection process can be largely divided into two types. One type is an initial cell selection process, and in this process, the UE does not have previous information on radio channels. Therefore, the UE searches for all the radio channels to find a suitable cell. In each channel, the UE searches for the strongest cell. Subsequently, if a suitable cell satisfying the cell selection criteria is found, then the UE selects the corresponding cell. The other type is a cell selection process using the stored information, and in this process, the UE uses information on radio channel stored in the UE, or selects a cell by using information being broadcasted from the cell. Accordingly, a cell may be quickly selected compared to an initial cell selection process. If a cell satisfying the cell selection criteria is found, then the UE selects the corresponding cell. If a cell satisfying the cell selection criteria is not found, then the UE performs an initial cell selection process.

The cell selection criteria used by the UE in the cell selection process may be represented by the formula in the following Table 1.

TABLE 1

Criteria for selecting a cell by the UE in LTE.

Cell selection criteria: Srxlev > 0
  Here, Srxlev = $Q_{rxlevmeas} - (Q_{rxlevmin} + Q_{rxlevminoffset}) - $ Pcompensation The parameters used in the above cell selection criteria are as follows.
  $Q_{rxlevmeas}$ Measured cell received level (RSRP)
  $Q_{rxlevmin}$ Minimum required received level in the cell (dBm)
  $Q_{rxlevminoffset}$ Offset to $Q_{rxlevmin}$ (offset)
  Pcompensation max($P_{EMAX}$-$P_{UMAX}$, 0) (dB)
  $P_{EMAX}$ Maximum transmission power allowed for the UE in the corresponding cell (dBm)
  $P_{UMAX}$ Maximum transmission power of the UE radio transmission unit (RF) based on the performance of the UE (dBm)

In the above Table 1, it may be seen that UE selects a cell having a value of the measured signal intensity and quality greater than a particular value specified by the cell providing a service. Furthermore, the parameters used in the above Table 1 are broadcasted via the system information, and the UE receives those parameter values to use them for the cell selection criteria.

If the UE selects a cell satisfying the cell selection criteria, then the UE receives the information required for the RRC_IDLE mode operation of the UE in the corresponding cell from the system information of the corresponding cell. The UE receives all the information required for the RRC_IDLE mode operation, and then waits in an idle mode to request a service (for example, originating call) to a network or receive a service (for example, terminating call) from a network.

After the UE selects a certain cell via a cell selection process, the signal intensity and quality between the UE and the base station may be changed due to the change of the UE mobility and wireless environment. Therefore, if the quality of the selected cell is deteriorated, then the UE may select another cell providing better quality. In this manner, if a cell is reselected, then a cell providing signal quality better than that of a currently selected cell is typically selected. This process is called a cell reselection. A basic object of the cell reselection process is typically to select a cell providing best quality to the UE from a standpoint of the radio signal quality. In addition to the standpoint of the radio signal quality, the network may notify the UE of its priority by determining it for each frequency. The UE that has received the priority may consider this priority in the first place than the radio signal quality criteria during the cell reselection process.

As described above, there is a method of selecting or reselecting a cell based on the signal characteristics of wireless environment. When reselecting a cell, in selecting a cell for the reselection, there may be cell reselection methods as described below, based on the radio access technology (hereinafter, referred to as "RAT") and frequency characteristics of a cell.

Intra-frequency reselection: A cell having a center-frequency similar to the RAT similar to the cell currently being used by the UE is reselected.
  Inter-frequency reselection: A cell having a center-frequency different from the RAT similar to the cell currently being used by the UE is reselected.
  Inter-REAT cell reselection: A cell using a different RAT from the RAT currently being used by the UE is reselected.

On the other hand, 3G or Evolved Packet System (EPS) services may be provided via a base station owned by a private person, particular service provider, or group in addition to a mobile communication service provider. Such a base station is called a Home Node B (HNB) or Home eNB (HeNB). Hereinafter, both the HNB and HeNB are commonly designated as a H(e)NB. An object of the H(e)NB is basically to provide specialized services only to a Closed Subscriber Group (CSG). However, those services may be provided to other users in addition to the CSG based on the operation mode setting of the H(e)NB.

Figure 5:
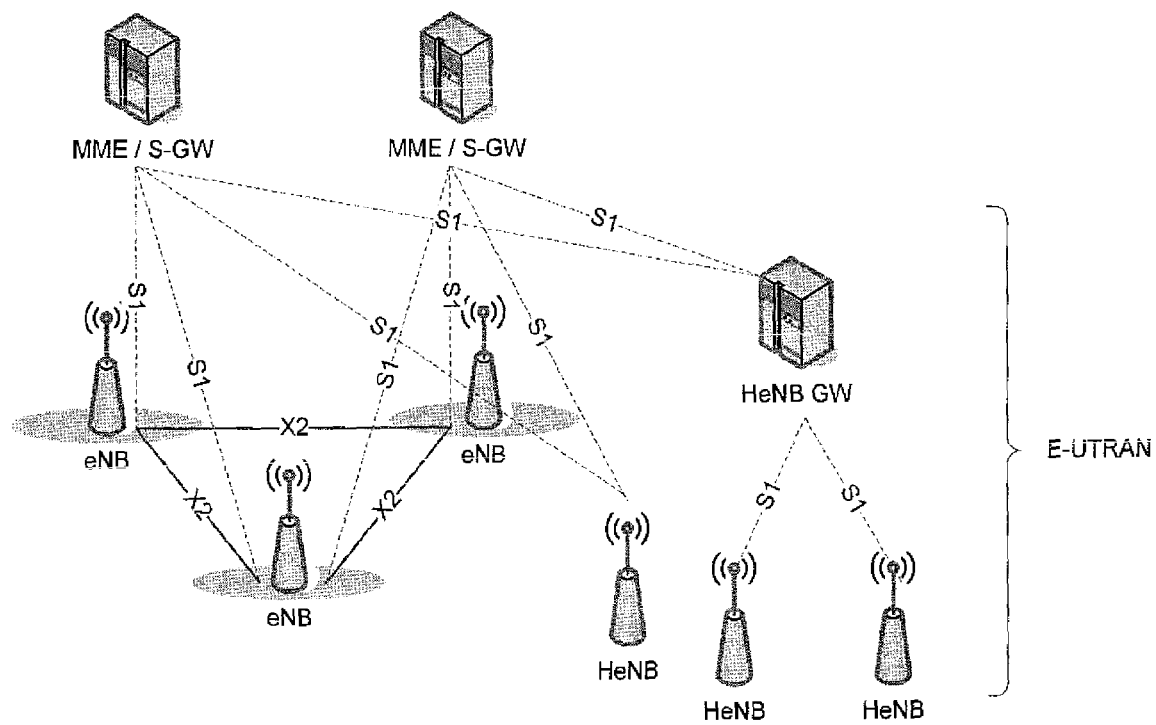
FIG. 5 is an exemplary view illustrating a network architecture of E-UTRAN for managing H(e)NB by using an H(e) NB gateway (GW)

FIG. 5 is an exemplary view illustrating a network architecture of E-UTRAN for managing an H(e)NB by using an H(e)NB gateway (GW).

As illustrated in FIG. 5, HeNBs may be connected to EPC via HeNB GW or directly connected to EPC. Here, the HeNB GW is regarded as a typical eNB to MME. Also, the HeNB GW is regarded as the MME to the HeNB. Therefore, an Si interface is connected between HeNB and HeNB GW, and also an Si interface is connected between the HeNB GW and the EPC. Furthermore, even in case of directly connecting between HeNB and EPC, it is connected via an Si interface. The function of HeNB is almost similar to the function of a typical eNB.

In general, H(e)NB has a low radio transmission output power compared to (e)NB owned by mobile communication service providers. Therefore, the service coverage provided by H(e)NB is typically smaller than the service coverage provided by (e)NB. Due to such characteristics, the cell provided by H(e)NB is classified as a femto cell in contrast to a macro cell provided by (e)NB from a standpoint of the service coverage. On the other hand, from a standpoint of provided services, when H(e)NB provides those services only to a CSG group, the cell provided by this H(e)NB is referred to as a CSG cell.

Each CSG has its own identification number, and this identification number is called a CSG ID (CSG identity). The UE may have a CSG list to which the UE itself belongs as a member thereof, and this CSG list may be changed by a request of the UE or a command of the network. Typically, one H(e)NB may support one CSG.

H(e)NB delivers the CSG ID of the CSG being supported by itself through the system information, thereby allowing only the corresponding CSG member UE to be accessed. When a CSG cell is found by the UE, what type of CSG being supported by this CSG cell can be checked by reading the CSG ID included in the system information. The UE that has read the CSG ID regards the corresponding cell as an accessible cell only if the UE itself is a member of the corresponding CSG cell.

It is not always required for H(e)NB to allow only the CSG UE to be accessed. Based on the configuration setting of H(e)NB, non-CSG member UE may be allowed to be accessed. The type of UE allowed to be accessed may be changed based on the configuration setting of H(e)NB. Here, the configuration setting denotes the setting of the operation mode of H(e)NB. The operation mode of H(e)NB can be divided into three types as follows based on the type of UE.

1) Closed access mode: A mode in which services are provided to particular CSG members only. A CSG cell is provided by H(e)NB.

2) Open access mode: A mode in which services are provided without any restriction of particular CSG members like typical (e)NB.

3) Hybrid access mode: A mode in which CSG services are provided to particular CSG members and also services are provided to non-CSG members like a typical cell. It is recognized as a CSG cell for the CSG member UE, and recognized as a typical cell for the non-CSG member UE. This cell is called a hybrid cell.

H(e)NB notifies the UE that the cell being serviced by itself is a CSG cell or typical cell, allowing the UE to know whether or not it can be accessed to the corresponding cell. H(e)NB being managed in a closed access mode broadcasts via the system information that it is a CSG cell. In this manner, H(e)NB allows the system information to include an one-bit CSG indicator indicating whether or not the cell being serviced by itself is a CSG cell in the system information. For example, the CSG cell broadcasts by setting the CSG indicator to TRUE. If the cell being serviced is not a CSG cell, then it may be used a method that the CSG indicator may be set to FALSE or the transmission of the CSG indicator is omitted. The UE should distinguish a typical cell provided by (e)NB from a CSG cell, and thus a typical (e)NB may also transmit the CSG indicator (for example, FALSE), thereby allowing the UE to know that the cell type provided by itself is a typical cell. Furthermore, the typical (e)NB may not transmit the CSG indicator, thereby allowing the UE to know that the cell type provided by itself is a typical cell, too. The CSG-related parameters transmitted by the corresponding cell for each cell type are represented in Table 2. Subsequently, the types of UE allowed to be accessed for each cell type are represented in Table 3.

TABLE 2

CSG-related parameters included in the system information for each cell type

|  | CSG Cell | Typical Cell |
| --- | --- | --- |
| CSG Indicator | 'CSG Cell' is indicated | 'Non-CSG cell' is indicated, or not transmitted |
| CSG Identity | Supported CSG identity is transmitted | Not transmitted |

TABLE 3

Type of UE allowed to be accessed for each cell type

|  | CSG Cell | Typical Cell |
| --- | --- | --- |
| UE not supporting CSG | Access disabled | Access enabled |
| Non-CSG member UE | Access disabled | Access enabled |
| CSG member UE | Access enabled | Access enabled |

Figure 6:
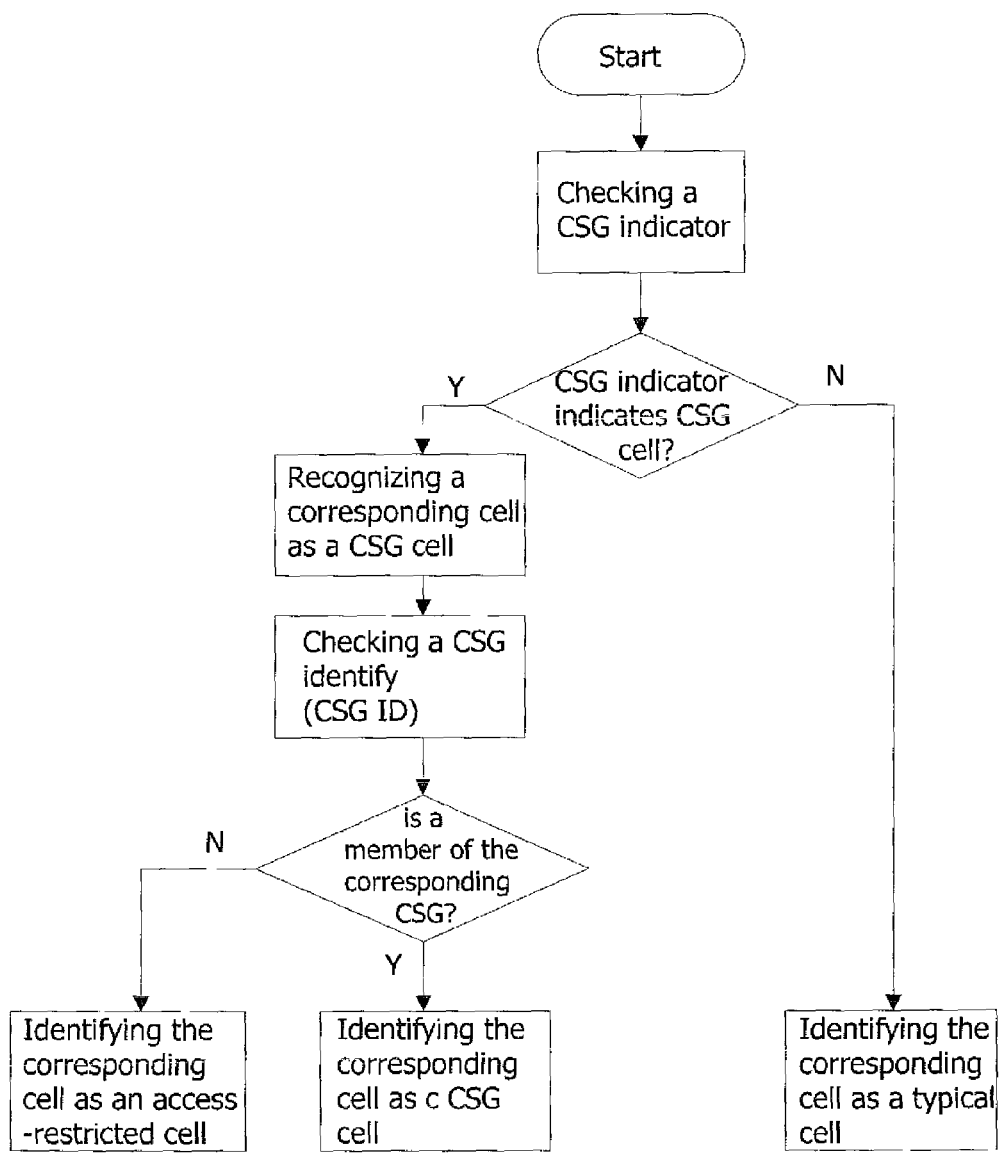
FIG. 6 is a first exemplary view illustrating a method of checking the access mode of a base station by the UE according to the present invention.

FIG. 6 is a first exemplary view illustrating a method of checking the access mode of a base station by the UE according to the present invention.

In the first step, the UE first checks the CSG indicator in the system information of the object cell in order to check what is the type of the object cell. After checking the CSG indicator, and then in the second step, if the CSG indicator indicates that the object cell is a CSG cell, then the UE recognizes the corresponding cell as a CSG cell. Subsequently, the UE checks the CSG identity or CSG identifier in the system information in order to check whether or not the UE itself is a CSG member of the object cell. If it is checked from the CSG identity that the UE is a CSG member of the object cell, then the corresponding cell will be recognized as an accessible CSG cell.

If it is checked from the CSG identity that the UE is not a CSG member of the object cell, then the corresponding cell will be recognized as an inaccessible CSG cell. If the CSG indicator indicates that the object cell is not a CSG cell in the first step, then the UE recognizes the object cell as a typical cell. Furthermore, if the CSG indicator is not transmitted in the first step, the UE recognizes the object cell as a typical cell.

In general, CSG cells and macro cells may be concurrently managed at a particular frequency. This frequency is called a mixed carrier frequency. The network may reserve particular physical layer CSG identities in a mixed carrier frequency for CSG cells. The physical layer CSG identity is called a Physical Cell Identity (PCI) in E-UTRAN, and called a Physical Scrambling Code (PSC) in UTRAN. For the sake of convenience of explanation, the physical layer CSG identity will be expressed by PCI. In a mixed carrier frequency, the CSG cell notifies information on the PCIs reserved for CSG at a current frequency via the system information. The UE received this information can determine whether or not this cell is a CSG cell from the PCI of the cell when a certain cell is found at the corresponding frequency. How this information being used by the UE will be illustrated below in case of two types of UE.

First, in case of the UE, not supporting the CSG-related function or having no CSG list to which the UE itself belongs, the UE does not need to regard a CSG cell as a selectable cell during the cell selection/reselection process. In this case, the UE checks only the PCI of the cell, and then the UE may immediately eliminate the corresponding cell during the cell selection/reselection process if the PCI is a reserved PCI for CSG. Typically, the PCI of a certain cell may be immediately known during a process of checking the existence of the corresponding cell in a physical layer by the UE.

Second, in case of the UE having a CSG list to which the UE itself belongs, when the UE wants to know a list of the neighboring CSG cells at a mixed carrier frequency it may be known that the corresponding cell is a CSG cell if only a cell having the PCI reserved for CSG is found, instead of individually checking the CSG identity of the system information of every cell found in the whole PCI range.

As described above, when H(e)NB operates by using either one of two methods, open access mode or closed access mode, it is enough to broadcast one-bit CSG indicator by H(e)NB in order to distinguish those two mode from each other. Also in case of a typical (e)NB, the UE determines whether the corresponding cell is a CSG cell or typical cell via a CSG indicator being transmitted from the base station.

However, H(e)NB can be managed in a hybrid access mode in addition to the open access mode or closed access mode. If H(e)NB is managed in a hybrid access mode, then a cell provided by the H(e)NB should be represented as a CSG cell for the member UE, and as a typical cell for the non-member UE. However, if H(e)NB is managed as a hybrid access mode, then a problem arose to which value the CSG indicator should be set. How the cell recognition is changed based on the setting of the CSG indicator will be considered from a standpoint of the UE.

If the CSG indicator is set to a CSG cell by the H(e)NB, then the UE, not supporting CSG or having no accessible CSG list, recognizes the hybrid cell as a CSG cell through this indicator and therefore does not try to access the cell. Therefore, the access to a hybrid cell by the non-member UE will be blocked. In this case, the corresponding cell is not a hybrid cell any more, and operates like a CSG cell allowing to be only accessed to CSG member UE.

Accordingly, the CSG identity of a hybrid cell is set to a non-CSG cell because the hybrid cell should be represented as a typical cell for the non-member UE and the UE not supporting CSG. However, if the CSG indicator is set to a non-CSG cell by the H(e)NB in this manner, then the UE recognizes the hybrid cell as a typical cell through this indicator and therefore tries to access the cell. At this time, it may not be known to the network that the UE trying to access is a CSG member of the corresponding cell because the UE does not consider whether or not the UE itself is a CSG member. As a result, the corresponding H(e)NB cannot provide better-quality services to the CSG member UE compared to the non-CSG member UE. Here, the access attempt may also include a handover process. For example, it may be considered a circumstance in which a CSG member UE of a certain hybrid cell notifies the base station being currently serviced of the hybrid cell as an object cell to be handed over in order to be handed over to this hybrid cell. At this time, though the UE is a CSG member of the corresponding hybrid cell, the UE determines that the corresponding cell is a typical cell, if the CSG indicator indicates it is not a CSG cell, and does not notify that the UE itself is a CSG member of the object cell. As described above, even if a CSG member UE of a certain hybrid cell is handed over to the hybrid cell, it is not known to the network that the UE is a CSG member of the corresponding object hybrid cell, and thus services cannot provided by distinguishing it from other non-member UEs. In other words, in an existing method of determining a cell type with the CSG indicator only, it cannot be provided a specialized service of the hybrid access mode only in which CSG services are provided to a particular CSG member and the services like a typical cell are provided even to a non-CSG member.

Consequently, the present invention provides a method of allowing UE to check H(e)NB in which mode it is currently managed among open/closed/hybrid access modes through the CSG indicator and CSG identity. Furthermore, if during a H(e)NB access process it is checked by the UE that the H(e)NB is being managed in a hybrid access mode by using the foregoing method, then the present invention provides a method of checking whether the corresponding hybrid cell should be regarded as a CSG cell or a typical cell.

In the present invention, H(e)NB being managed in a hybrid access mode sets the CSG indicator of a hybrid cell to a non-CSG cell and then transmits it, and thus the hybrid cell is represented as a typical cell through this CSG indicator value for the UE not supporting CSG. However, this hybrid cell can provide CSG services to the CSG member UE and thus transmits CSG ID. Accordingly, the setting of CSG-related parameter values for each cell type is represented in the following Table 4.

TABLE 4

CSG-related parameters included in the system information for each cell type

| | CSG Cell | Typical Cell | Hybrid Cell |
|---|---|---|---|
| CSG Indicator | 'CSG Cell' is indicated | 'Non-CSG cell' is indicated, or not transmitted | 'Non-CSG cell' is indicated, or not transmitted |
| CSG Identity | Supported CSG identity is transmitted | Not transmitted | Supported CSG identity is transmitted |

Subsequently, the type of UE and the type of access allowed to be accessed for each cell type are represented in Table 5.

TABLE 5

Type of UE allowed to be accessed for each cell type

| | CSG Cell | Typical Cell | Hybrid Cell |
|---|---|---|---|
| UE not supporting CSG | Access disabled | Access enabled (Typical access) | Access enabled (Typical access) |
| Non-CSG member UE | Access disabled | Access enabled (Typical access) | Access enabled (Typical access) |
| CSG member UE | Access enabled (CSG access) | Access enabled (Typical access) | Access enabled (CSG access) |

Figure 7:
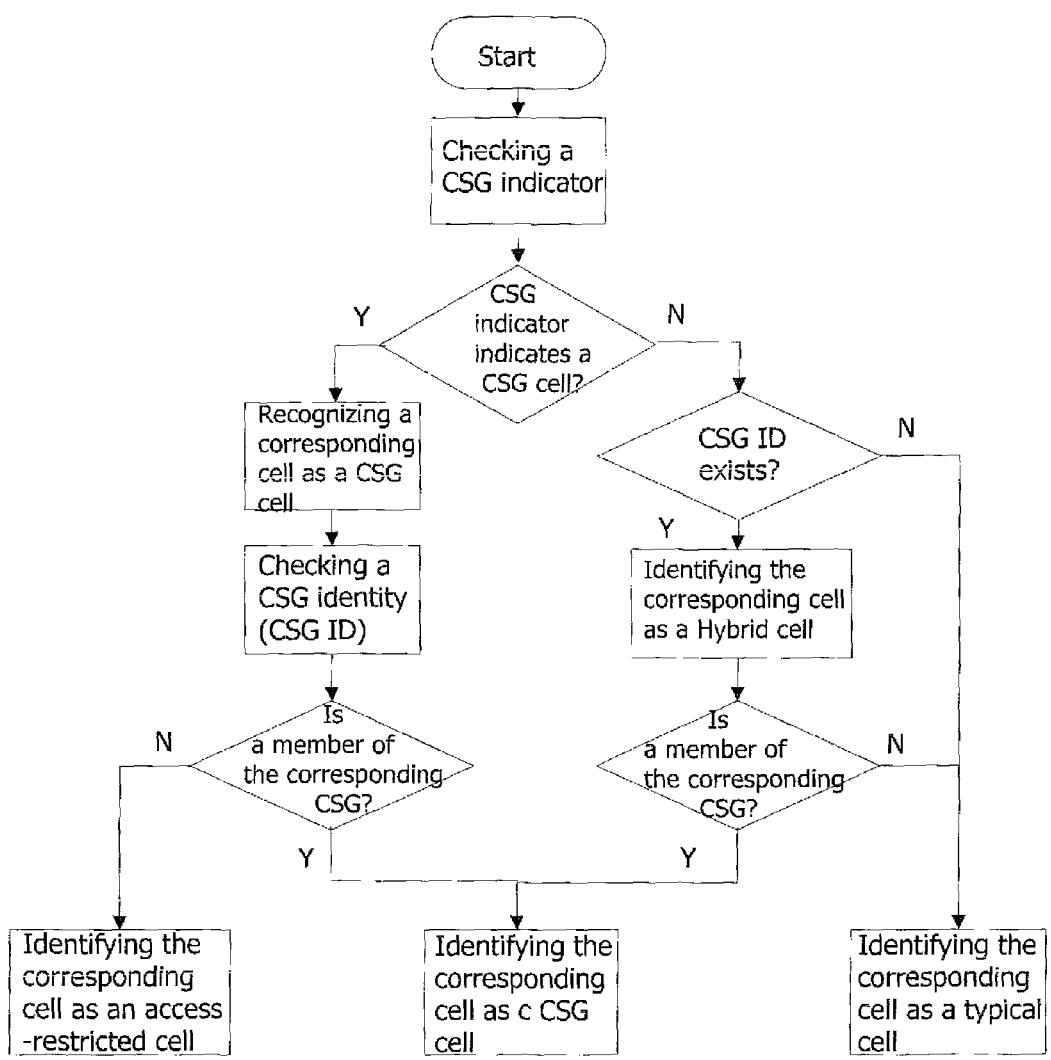
FIG. 7 is a second exemplary view illustrating a method of checking the access mode of a base station by the UE according to the present invention.

FIG. 7 is a second exemplary view illustrating a method of checking the access mode of a base station by the UE according to the present invention. FIG. 7 illustrates a procedure of the UE for additionally recognizing a hybrid cell and if it is a hybrid cell then checking whether or not it is a CSG member of the corresponding cell, thereby specifically determining the type of a cell. The procedure will be described below in detail.

In the first step, the UE first checks the CSG indicator in the system information of the object cell in order to check what is the type of the object cell. After checking the CSG indicator, and then in the second step, if the CSG indicator indicates that the object cell is a CSG cell, then the UE recognizes the corresponding cell as a CSG cell. Subsequently, the UE checks the CSG identity in the system information in order to check that the UE itself is a CSG member of the object cell. If it is checked from the CSG identity that the UE itself is a CSG member of the object cell, then the corresponding cell will be recognized as an accessible CSG cell, and if it is checked from the CSG identity that the UE itself is not a CSG member of the object cell, then the corresponding cell will be regarded as an inaccessible cell.

If the CSG indicator indicates that the object cell is not a CSG cell in the first step, then the UE checks whether or not the object cell transmits a CSG identity. Subsequently, if it is checked that a CSG identity is transmitted, then the UE recognizes the object cell as a hybrid cell, and checks the CSG identity of the corresponding cell to check that the UE itself is a CSG member of the object cell, and if it is checked that the UE is a CSG member of the object cell, then the UE recognizes the corresponding cell as an accessible cell and then notifies the network of the fact. However, if it is checked that the UE is not a CSG member of the object cell, then the UE recognizes the corresponding cell as a typical cell, then notifies the network of the fact. If it is checked that the CSG indicator is not transmitted in a process of checking the existence of the CSG identity, then the UE recognizes the object cell as a typical cell.

Figure 8:
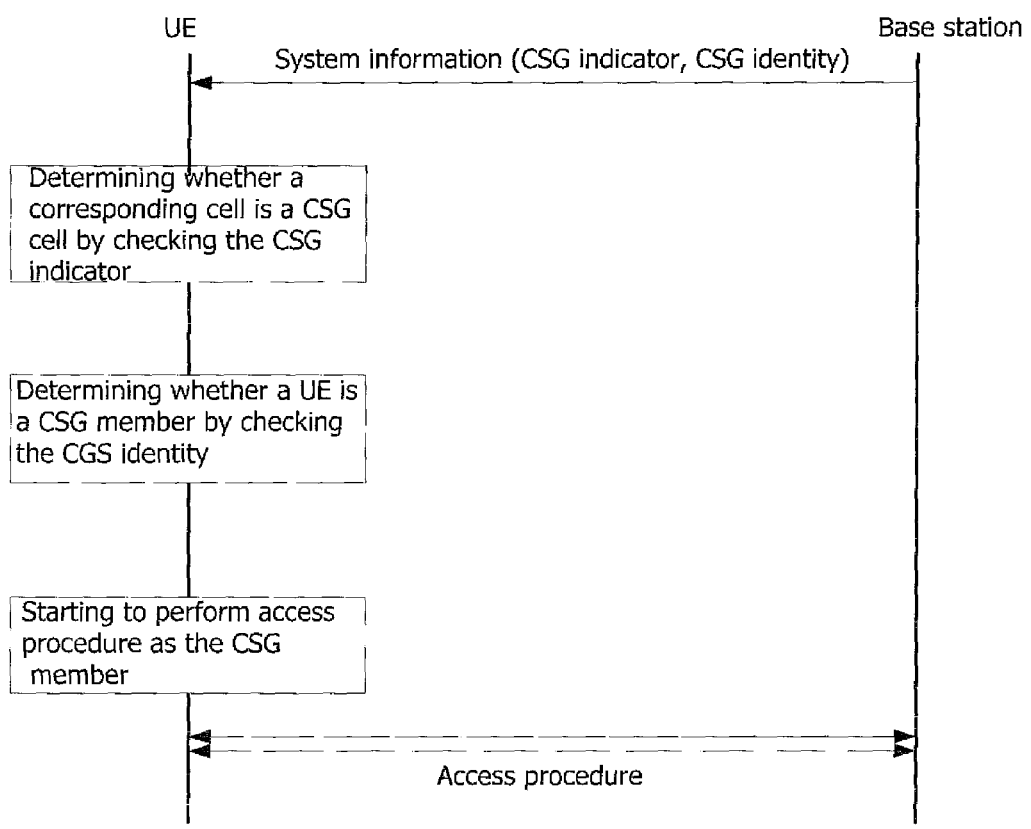
FIG. 8 is an exemplary view illustrating a process for connecting a base station by CSG subscription member UE in a CSG (Closed Subscriber Group) cell.

FIG. 8 is an exemplary view illustrating a process for connecting a base station by CSG subscription member UE in a CSG (Closed Subscriber Group) cell.

In the first step, the UE receives the system information including a CSG indicator and a CSG identity from a base station. Here, the system information may be received via various control channels such as a broadcast control channel (BCCH). After receiving the CSG indicator and the CSG identity, the UE first checks the received CSG indicator to check that the object cell for access is a CSG cell, and if it is checked that the object cell for access is the CSG cell, then the UE checks the received CSG identity to check whether or not the UE itself is a CSG member of the object cell, then starts to be connected as a CSG member. In other words, an initial connection process will be performed between the UE and the base station (for example, RACH procedure).

Figure 9:
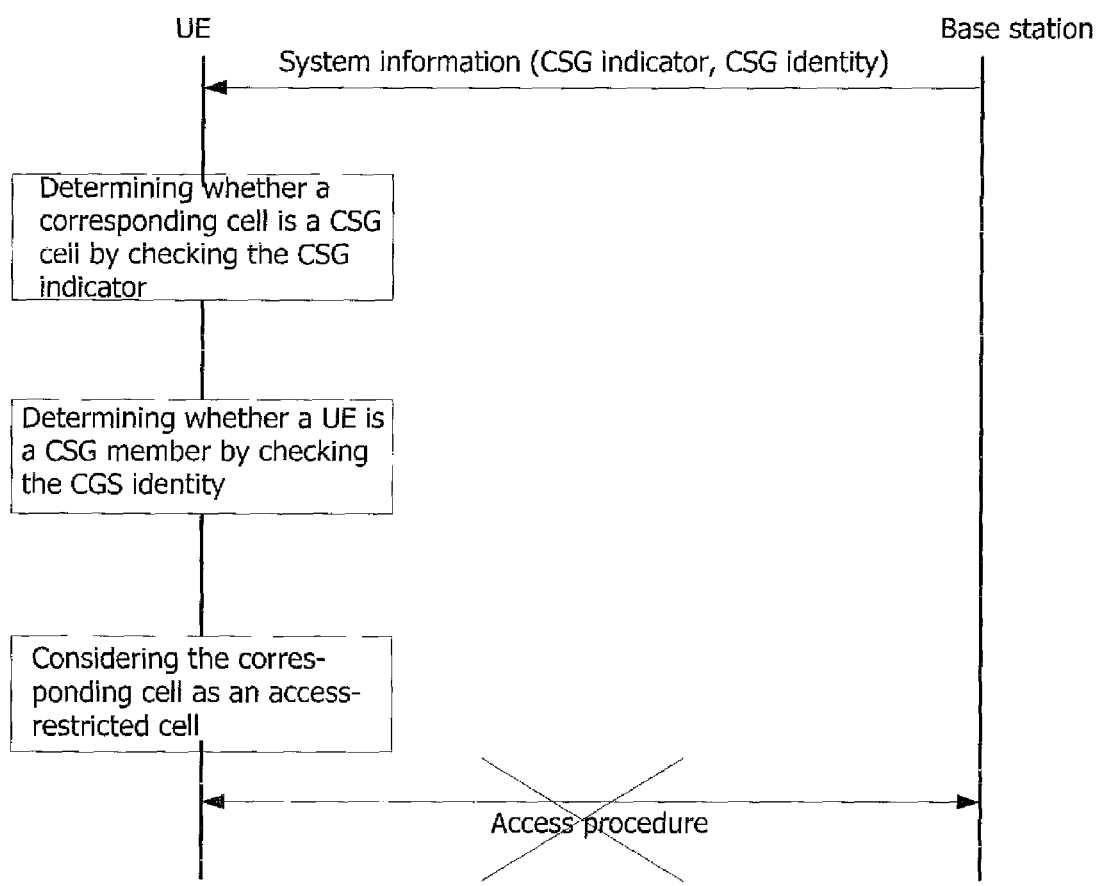
FIG. 9 is an exemplary view illustrating a process for connecting a base station by UE which has an accessible CSG list but is not a member of the corresponding cell in a CSG (Closed Subscriber Group) cell.

FIG. 9 is an exemplary view illustrating a process for connecting a base station by UE which has an accessible CSG list but is not a member of the corresponding cell in a CSG (Closed Subscriber Group) cell.

First, the UE receives the system information including a CSG indicator and a CSG identity from a base station. Subsequently, the UE first checks the received CSG indicator to check that the object cell for access is a CSG cell, and if it is checked that the object cell for access is a CSG cell, then the UE checks the received CSG identity to check whether or not the UE itself is a CSG member of the object cell. However, as a result of checking the CSG identity, the UE itself is not a CSG member of the object cell, and therefore, the UE regards the object cell as an access-restricted cell, and does not perform an initial connection process between the UE and the base station.

Figure 10:
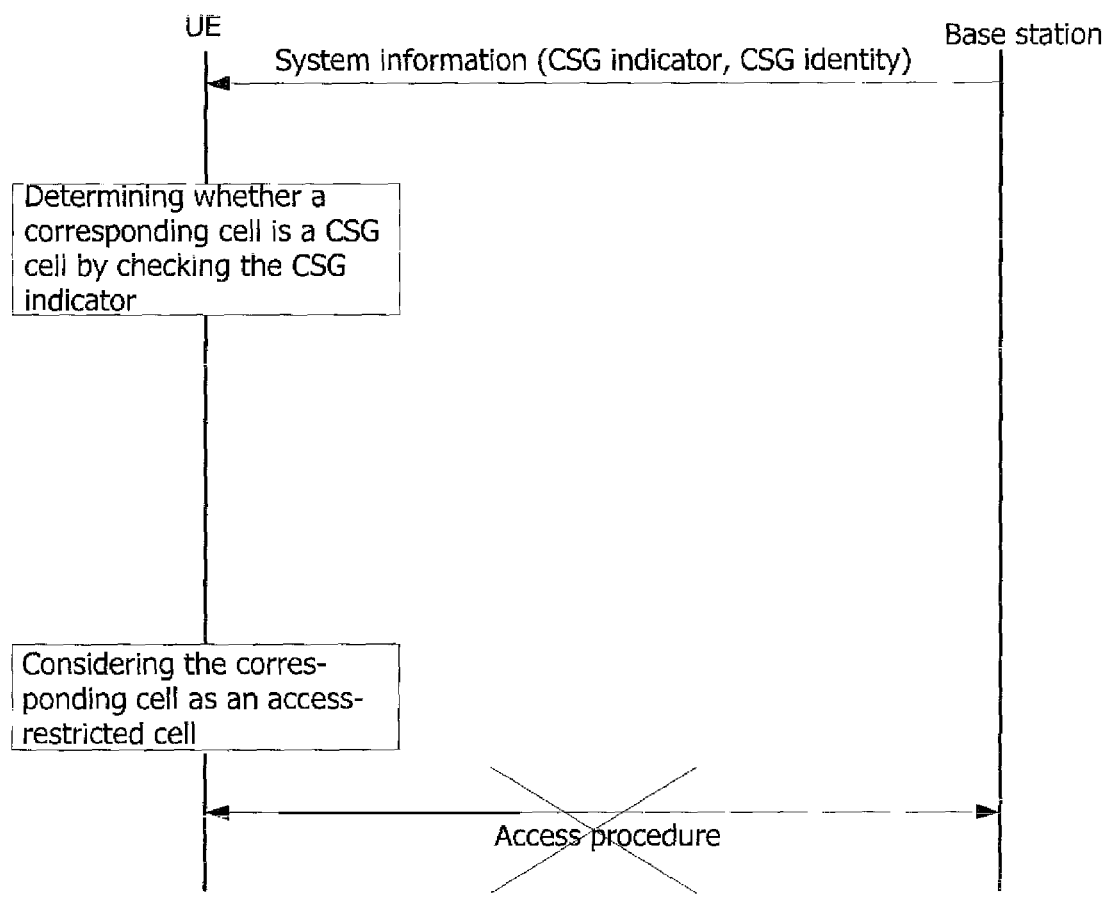
FIG. 10 is an exemplary view illustrating a process for connecting a base station by UE which does not have an accessible CSG list to the corresponding cell in a CSG (Closed Subscriber Group) cell.

FIG. 10 is an exemplary view illustrating a process for connecting a base station by UE which does not have an accessible CSG list to the corresponding cell in a CSG (Closed Subscriber Group) cell.

First, the UE receives the system information including a CSG indicator and a CSG identity from a base station. Subsequently, the UE first checks the received CSG indicator to check that the object cell for access is a CSG cell. However, the UE does not have an accessible list for the corresponding cell, and therefore, the UE regards the object cell as an access-restricted cell, and does not perform an initial connection process between the UE and the base station.

Figure 11:
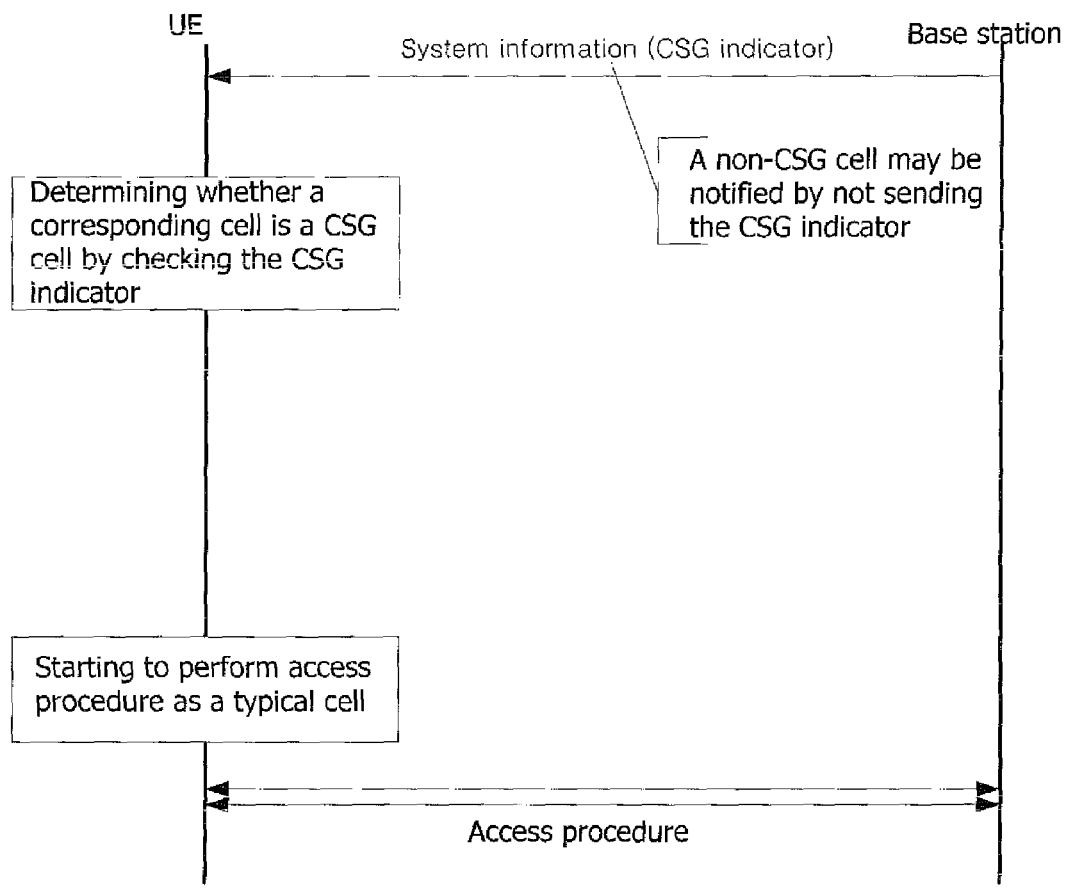
FIG. 11 is an exemplary view illustrating a process for connecting a base station by every UE in a non-CSG (Closed Subscriber Group) cell.

FIG. 11 is an exemplary view illustrating a process for connecting a base station by every UE in a non-CSG (Closed Subscriber Group) cell.

First, the UE receives the system information including a CSG indicator from a base station. Subsequently, the UE checks the received CSG indicator to check that the object cell for access is a CSG cell. Subsequent to the checking procedure, it is checked that the object cell for access is a typical cell, and therefore, the UE regards the object cell for access as a typical cell, and performs an initial connection process between the UE and the base station. Checking the object cell as a typical cell may be notified by not sending the CSG indicator in the system information from the base station. In other words, if it is checked that there exists no information for the CSG indicator in the system information received from the base station, then the UE regards the object cell as a typical cell, and performs an initial connection process between the UE and the base station.

Figure 12:
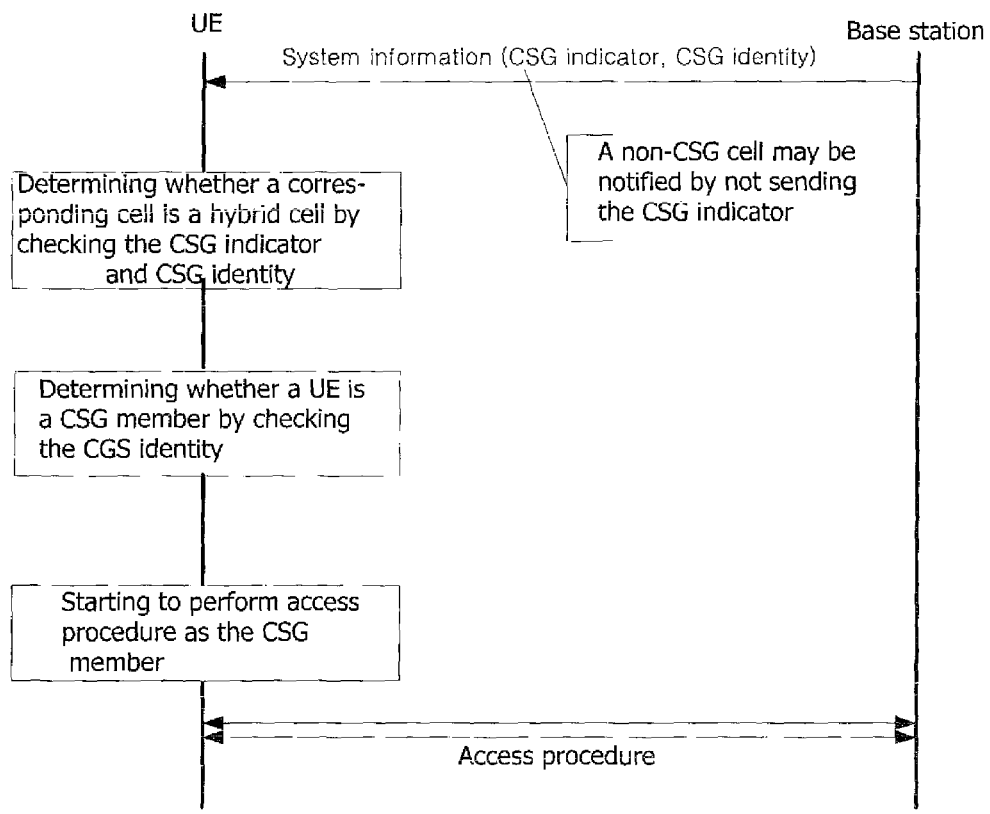
FIG. 12 is an exemplary view illustrating a process for connecting a base station by CSG subscription member UE in a hybrid cell.

FIG. 12 is an exemplary view illustrating a process for connecting a base station by CSG subscription member UE in a hybrid cell.

First, the UE receives the system information including a CSG indicator and a CSG identity from a base station. Subsequently, the UE checks that the object cell for access is a hybrid cell based on the received CSG indicator and CSG identity. Subsequently, the UE checks that the UE itself is a CSG member of the object cell based on the received CSG identity, and if it is true, then performs an initial connection process as a CSG member between the UE and the base station. Here, if the CSG indicator is not included in the received system information, then the UE regards the object cell as a typical cell and performs an initial connection process with the base station.

FIG. 13 is an exemplary view illustrating a procedure for connecting a base station by non-CSG subscription member UE in a hybrid cell.

First, the UE receives the system information including a CSG indicator and a CSG identity from a base station. Subsequently, the UE checks that the object cell for access is a hybrid cell based on the received CSG indicator and CSG identity. Subsequently, the UE checks that the UE itself is a CSG member of the object cell based on the received CSG identity, and if it is not true, then the UE regards the object cell as a typical cell and performs an initial connection process with the base station. Here, if the CSG indicator is not included in the received system information, then the UE regards the object cell as a typical cell and performs an initial connection process with the base station.

The present disclosure may provide a method of determining an access mode of a cell in a wireless communication system, the method comprising: determining whether the access mode of the cell is a first mode, wherein one or more user equipments (UEs) in a particular subscriber group are only allowed to be accessed in the first mode; checking an existence of a subscriber group identity, if it is determined that the access mode of the cell is not the first mode; and considering the access mode of the cell as a second mode, if the subscriber group identity exists, wherein the one or more UEs in the particular subscriber group or all UEs in the cell are selectively allowed to be accessed in the second mode, wherein a cell in the first mode is a CSG (Closed Subscriber Group) cell and a cell in the second mode is a hybrid cell, a cell type indicator is used to determine whether the access mode of the cell is the first mode or not, the cell type indicator is a CSG (Closed Subscriber Group) indicator and the subscriber group identity is a CSG identity, and the hybrid cell has the CSG indicator set to 'FALSE' and broadcasts the CSG identity.

Also, it can be said that the present disclosure may provide a method of determining an access mode of a cell in a wireless communication system, the method comprising: determining whether UE supports a particular access mode of the cell, wherein one or more UEs in a particular subscriber group or all UEs in the cell is selectively allowed to be accessed in the particular access mode; checking a subscriber group identity, if it is determined that the UE supports the particular access mode; and checking a subscriber group indicator in order to determine the access mode of the cell, if it is determined that the UE does not support the particular access mode, wherein a cell in the particular access mode is a hybrid cell, the subscriber group identity is a CSG (Closed Subscriber Group) identity, and the subscriber group indicator is a CSG (Closed Subscriber Group) indicator.

Also, it can be said that the present disclosure may provide a method of determining an access mode of a cell in a wireless communication system, the method comprising: providing information and a subscriber group identity to UE in order to determine the access mode of the cell, wherein the information indicates that the UE is not in a particular access mode, and the particular access mode only allows one or more UEs in a particular subscriber group to be accessed, wherein a cell in the particular access mode is a CSG (Closed Subscriber Group) cell, the information indicating that the UE is not in the particular access mode, is provided to the UE by transmitting a subscriber group indicator, the subscriber group indicator is set to 'FALSE', and the information indicating that the UE is not in the particular access mode, is provided to the UE by not transmitting a subscriber group indicator.

Hereinafter, a terminal according to the present invention will be described.

A terminal according to the present invention may includes all types of terminals capable of using services that can transmits and/or receives data to and/or from each other in a wireless environment. In other words, a terminal according to the present invention may be used in a comprehensive meaning by including a mobile communication terminal (for example, user equipment (UE), portable phone, cellular phone, DMV phone, DVB-H phone, PDA phone, PTT phone, and the like), a notebook, a laptop computer, a digital TV, a GPS navigation, a portable gaming device, an MP3, other home appliances, and the like.

A terminal according to the present invention may include a basic hardware architecture (transmission and/or reception unit, processing or control unit, storage unit, and the like) required to perform the function and operation for effectively receiving the system information as illustrated in the present invention.

The method according to the present invention as described above may be implemented by software, hardware, or a combination of both. For example, the method according to the present invention may be stored in a storage medium (for example, internal memory, flash memory, hard disk, and the like, in a mobile terminal or base station), and may be implemented through codes or instructions in a software program that can be implemented by a processor (for example, microprocessor, in a mobile terminal or base station), and the like.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method of determining a type of cell in a wireless communication system, the method comprising:
   determining a cell as a hybrid cell when a cell type indication bit is set to 'FALSE' but broadcast a subscriber group identity,
   wherein the one or more User Equipments (UEs) in a particular subscriber group or all UEs in the cell are selectively allowed to be accessed in the hybrid cell, and
   wherein the hybrid cell is considered by the UE as a Closed Subscriber Group (CSG) cell when the subscriber group identity of the hybrid cell belongs to an allowed Closed Subscriber Group (CSG) list of the UE.

2. The method of claim 1, wherein the cell type indication bit is a Closed Subscriber Group (CSG) indication bit.

3. The method of claim 1, wherein the subscriber group identity is a CSG identity.

4. The method of claim 1, wherein the hybrid cell is considered by all other UEs as a normal cell when the subscriber group identity of the hybrid cell is not belonged to an allowed CSG list of the UE.

5. The method of claim 1, wherein the CSG cell only allows one or more UEs in the particular subscriber group to be accessed.

6. A method of determining a type of cell in a wireless communication system, the method comprising:
   providing a cell type indication bit and/or a subscriber group identity to user equipment (UE) in order to determine the type of cell by the UE,
   wherein the type of cell is considered as a hybrid cell when the cell type indication bit is set to 'FALSE' but broadcast the subscriber group identity,
   wherein the one or more User Equipments (UEs) in the particular subscriber group or all UEs in the cell are selectively allowed to be accessed in the hybrid cell, and
   wherein the hybrid cell is considered by the UE as a Closed Subscriber Group (CSG) cell when the subscriber group identity of the hybrid cell belongs to an allowed CSG list of the UE.

7. The method of claim 6, wherein the cell type indication bit is a CSG indication bit.

8. The method of claim 6, wherein the subscriber group identity is a CSG identity.

9. The method of claim 6, wherein the hybrid cell is considered by all other UEs as a normal cell when the subscriber group identity of the hybrid cell is not belonged to an allowed CSG list of the UE.

10. The method of claim 6, wherein the CSG cell only allows one or more UEs in the particular subscriber group to be accessed.

11. An apparatus for determining a type of cell in a wireless communication system, the apparatus comprising:
- a receiving unit adapted to receive a cell type indication bit and/or a subscriber group identity;
- a controlling unit adapted to determine a cell as a hybrid cell when a cell type indication bit is set to 'FALSE' but broadcast a subscriber group identity,
- wherein the one or more User Equipments (UEs) in a particular subscriber group or all UEs in the cell are selectively allowed to be accessed in the hybrid cell, and
- wherein the hybrid cell is considered by the UE as a Closed Subscriber Group (CSG) cell when the subscriber group identity of the hybrid cell belongs to an allowed CSG list of the UE.

12. The apparatus of claim 11, wherein the cell type indication bit is a CSG indication bit.

13. The apparatus of claim 11, wherein the subscriber group identity is a CSG identity.

14. The apparatus of claim 11, wherein the hybrid cell is considered by all other UEs as a normal cell when the subscriber group identity of the hybrid cell is not belonged to an allowed CSG list of the UE.

15. The apparatus of claim 11, wherein the CSG cell only allows one or more UEs in the particular subscriber group to be accessed.

* * * * *

UNITED STATES PATENT AND TRADEMARK OFFICE
CERTIFICATE OF CORRECTION

PATENT NO. : 8,145,227 B2
APPLICATION NO. : 13/210256
DATED : March 27, 2012
INVENTOR(S) : Sung-Hoon Jung et al.

Page 1 of 1

It is certified that error appears in the above-identified patent and that said Letters Patent is hereby corrected as shown below:

Col. 18, Claim 1, at line 3, insert the words --, by a User Equipment (UE),-- after the word "determining";
at line 7, insert the word --other-- between the words "all" and "UEs".

Col. 18, Claim 6, at line 6, insert the words --by the UE-- after the words "wherein the type of cell is considered";
at line 10, insert the word --other-- between the words "all" and "UEs".

Col. 19, Claim 11, at line 9, insert the word --other-- between the words "all" and "UEs".

Signed and Sealed this
Thirty-first Day of July, 2012

David J. Kappos
*Director of the United States Patent and Trademark Office*